United States Patent
Paulson (10) Patent No.: US 7,564,540 B2
(45) Date of Patent: Jul. 21, 2009

(54) FIBRE OPTIC SENSOR METHOD AND APPARATUS

(75) Inventor: Peter O. Paulson, Calgary (CA)

(73) Assignee: Pure Technologies Ltd., Calgary, Alberta (CA)

( * ) Notice: Subject to any disclaimer, the term of this patent is extended or adjusted under 35 U.S.C. 154(b) by 65 days.

(21) Appl. No.: 11/569,419

(22) PCT Filed: May 24, 2005

(86) PCT No.: PCT/CA2005/000784

§ 371 (c)(1),
(2), (4) Date: Apr. 20, 2007

(87) PCT Pub. No.: WO2005/114226

PCT Pub. Date: Dec. 1, 2005

(65) Prior Publication Data

US 2007/0247631 A1    Oct. 25, 2007

(30) Foreign Application Priority Data

May 21, 2004   (CA)   .................................. 2467898

(51) Int. Cl.
*G01B 9/02*   (2006.01)
(52) U.S. Cl. ...................... 356/35.5; 356/477
(58) Field of Classification Search ................ 356/35.5, 356/73.1, 477
See application file for complete search history.

(56) References Cited

U.S. PATENT DOCUMENTS 5,355,208 A * 10/1994 Crawford et al. ........... 356/35.5

OTHER PUBLICATIONS

Choi et al., "Distributed fiber optic pressure/seismic sensor for low cost monitoring of long perimeters," Proceedings of SPIE, Sep. 18, 2003, vol. 15, No. 3. Mar. 2003.*

* cited by examiner

*Primary Examiner*—Hwa (Andrew) S Lee
(74) *Attorney, Agent, or Firm*—Daphne L. Maravei; Blake, Cassels & Graydon LLP (57)    ABSTRACT

This invention uses an interferometric fiber optic sensor, particularly a Sagnac or Michelson interferometer, in a first fiber to monitor a sensing length of the first fiber and to detect disturbances. Signals indicating disturbances are classified as being of interest or not of interest, depending on predetermined criteria. Disturbances of interest can be, for example, the breaking of reinforcement wires in concrete pipe, the breaking of wires in suspension cables, a fire, a pipeline leak, or an intrusion. A location sensor system is used to determine the location of disturbances of interest, and to confirm the interferometer signal to reduce noise. The location sensor system is a fiber optic sensor, such as a phase OTDR sensor or a Brillouin effect sensor, which can detect the location of events it senses. It is present either in the first fiber or in a separate fiber laid adjacent the first fiber along its sensing length, as for example in the same optical cable.

20 Claims, 4 Drawing Sheets

FIBRE OPTIC SENSOR METHOD AND APPARATUS

FIELD OF THE INVENTION

This invention relates to a method of identifying a disturbance of interest using a fibre optic interferometer, and finding the location of the disturbance by using a separate sensor system. Disturbances of interest can be, for example, the breaking of reinforcement wires in concrete pipe, the breaking of wires in suspension cables, a pipeline leak, or an intrusion by human or vehicle.

BACKGROUND TO THE INVENTION

Fibre optic sensors exist which can monitor events over a distance of twenty kilometers or more, and which can be operated with relatively low power. Such fibre optic sensors can detect acoustic and seismic disturbances, such as for example the footfalls of an intruder near a monitored perimeter, the noises associated with intentional damage of a monitored piece of infrastructure such as an electrical or communications cable, the noise of a leak in a pipeline, or the breaking of a reinforcing wire in a concrete pipeline or a wire in a bridge cable. Some such sensors have spaced sensing gratings, spaced by shielded portions, so that the location of a disturbance can be found by determining at which grating(s) the disturbance is noted. Others use pulsed laser light, where reflected signals caused by a disturbances are reflected back to the origin and the location from which the signals came is determined by the time lag from the pulse to the reception of the reflected signal.

Such fibre optic sensors have not been very effective, because many different types of disturbance can trigger a response. Once a response is triggered, the location from which it came must be investigated to determine whether a condition requiring corrective action is present. Further, sensors which depend on the reflection of a pulse may miss or misinterpret transient effects which have their maximum effect at a time when the pulse is not scanning the particular location where they occur.

Interferometric sensors are known which are sensitive to the measurand for a long length, for example, the entire length of the fibre optic sensor. Because the entire length, or a long length in the area of interest, is sensitive to the measurand, a signal indicating a disturbance is acquired at or very close to the source of the disturbance. This gives an advantage in signal-to-noise ratio, in that the sensor is not displaced longitudinally from the disturbance along the fibre, as is the case where there are spaced, fixed sensors. Because the distance from the nearest sensing point to the source of the disturbance is minimized, the deterioration of the signal-to-noise ratio relating from signal attenuation with distance is also minimized.

Interferometric sensors are well known in the art, and several types are known, such as a Sagnac effect interferometric sensor shown in Udd U.S. Pat. No. 5,636,021 or a Michelson interferometric sensor as shown in Jones et al U.S. Pat. No. 4,725,143

Finding the location at which the disturbance occurred along the length of an interferometric sensor is difficult. Udd (U.S. Pat. No. 5,636,021), Tapanes et. al (U.S. Pat. No. 6,621,947) and Kyoo, Juarez and Taylor ((2000) SPIE, Vol. 5090. Pp 131-141 have tried to achieve the location of the disturbance using amplitude ratios of counter-propagating beams (Udd), arrival times of disturbances in loop interferometers (Tapanes) or phase sensitive, optical time domain reflectometry (Kyoo, Jurarez and Taylor). However, the proposed ways of finding the location do not work well. In Udd, if the return loop of the Sagnac loop is affected by the disturbance, the ratiometric approach used to estimate the location does not work well, and it is often not possible to tell if the return loop is affected. In Tapanes, the slew rate of the signals arising from a disturbance makes the source location difficult.

In the case of time domain reflectometry-based methods, such as that of Kyoo, Fernades and Taylor, the location of the disturbance can be determined by seeing the point along the returned signal of a pulse where it is perturbed, or where a perturbation starts, arising from the disturbance. However, the use of a pulsed laser of this sort means that there is not continuous monitoring. Instead, each location along the fibre optic cable is only monitored at the times when a pulse passes through it. Further, especially in long sensors, there is considerable noise and only limited bandwidth is available. Continuous monitoring can be very important when one is sensing an evanescent event, or an event where the measured "signature" changes rapidly with time, making it impossible to deduce what caused the event without a complete record. Also, the reduced bandwidth often gives insufficient information to characterize the signal received, in order to assess its likely cause.

Some examples of evanescent events include:
the acoustic signal caused by the breakage of a reinforcing wire in a concrete water pipe wrapped with reinforcing wires.
the acoustic signal caused when a reinforcing wire in the bridge cable snaps.
the landing of an object, such as a thrown object, which has been thrown into a perimeter guarded by a perimeter intrusion sensing system.

Known fibre optic sensors do not both identify the location from which a signal comes and give enough information to make a reliable identification of what is causing the signals. In this way, they are inferior to existing non-fibre-optic systems. For example, Paulson U.S. Pat. No. 5,798,457 uses acoustic or seismic detectors in an array to detect signals and analyse both the location from which the signal arises and its characteristics to see if it is indicative of a condition such as a wire break.

BRIEF DESCRIPTION OF THE INVENTION

The invention uses two separate sensors.

The first is a fibre optic interferometer, which senses all parts of the length to be sensed, and does it continuously. This can detect evanescent effects. Further, it detects disturbances which produce signals anywhere within a wide bandwidth. Information can be extracted to indicate the frequency distribution by time of signals being monitored, thereby giving a good indication of what caused the signals.

Suitable fibre optic interferometers are, for example, Sagnac-effect interferometers and Michelson interferometers.

Signals output from the fibre optic interferometer are examined, as for example by a computer, to see if they are apparently representative of an "event of interest". An event of interest is a signal or group of signals having one or more predetermined characteristics which are likely to have occurred as a result of a condition for which the monitoring is being carried out.

An "event of interest" is predefined by the operator of the system, for the particular sensor system. Generally, the operator will wish to investigate any signal or group of signals which has more than a particular peak energy or more than a particular peak energy in a chosen frequency band or bands.

The peak energy can be displayed on a monitor by an analog or digital signal. The minimum peak energy which is of interest can be determined by doing test events on the actual system or a test system or other installed system with similar characteristics, observing the signals output from such events, and choosing a lower peak energy than output by such events as a threshold energy. Any event exhibiting signals with more than the threshold energy is then defined as an event of interest.

The test events can be chosen with regard to the type of risk which is being monitored. For example, in a system designed to detect wire breaks in prestressed reinforcement wires for wire wrapped concrete pipes or prestressed reinforcing wires for a concrete floor in building, several reinforcing wires can be cut deliberately to observe the response. Where the system is designed to detect damage to a bridge, several test operations can be carried out, such as a simulated vandalism attack on a pylon or cable, a break of a wire in a bridge cable, and a vehicle hitting the bridge. In each case, the response is observed. Where the system is designed to detect intrusion, the response is noted to passage of a human and passage of a vehicle. From the testing, a peak energy level is chosen which is low enough to include all of the likely events which are deemed to be of interest in the system, and any event exhibiting a signal with that much or more energy is defined as an event of interest. If desired, data can also be gathered on the characteristic shapes of the graph of the signal and the rapidity of signal decay for particular events. The spectral densities of signals at different wavelengths from different kinds of events can also be determined. This provides data which can be used to screen signals initially chosen as being events of interest, with a view to excluding some which, from the characteristics of the extra data, appear to be explicable as being caused by some event which is not of interest in the context of the monitoring.

The second sensor is a location sensor. This produces signals from over substantially the same length of sensor as the interferometer. In normal operation, the signals received by the location sensor are kept for a suitable period of time and are then scrapped. However, when the signal output by the interferometric sensor is determined to be an event of interest, then the signals from the location sensor for the time at which the event of interest occurred, and preferably for a period of time before and after the event of interest are saved and examined to see if there is anomalous activity at any location at or about that time. Once the location is known, the operator (or an automated system) may re-evaluate whether the event is an event of interest or not, based on the location. For example, a sound characteristic of a truck passing could be considered as not being an event of interest if it comes from a location along an intrusion detection system sensor near a highway, but the same signal could be considered as an event of interest when it comes from a location along the sensor where no trucks are expected to be present.

Thus, the outputs of the two sensors are correlated so that the user can associate a disturbance position as calculated by the location sensing sensor with a particular set of features determined by the interferometic sensor.

The location sensor is also a fibre optic sensor, but one which gives the location of disturbances that it detects, such as a phase OTDR sensor or a Brillouin effect sensor. The location sensor can be in the same optical fibre as the interferometer, or it can be in a separate optical fibre adjacent to the fibre optic interferometer. Preferably, it will be in a separate optical fibre located in the same cable as the interferometer sensor.

According to the invention, the identification of an event of interest is discerned by the higher bandwidth interferometric sensor. If the sensor is deployed in an environment where many noises are generated, then the recognition that a particular event contains the characteristics of interest is required. When such an event is recognized, then the position of the source of the event must be discerned. This is done by examining the temporal appearance and extinction of some characteristics of the event on both sensors. Because each event will affect both sensors for the same time, starting at the same time, and ending at the same time if the sensors are in the same position relative to the structure they are monitoring, then a temporal correlation of the appearance and extinction of the features distinguishing that event from background noise should allow the event as it appears on each separate sensor to both be identified as the event of interest.

For example, in a pre-stressed water pipeline such as discussed by Paulson (U.S. Pat. No. 6,082,193), a distributed interferometric sensor and a phase OTDR can both be constructed in an optical fibre deployed within the pipeline. Flow noise, traffic disturbances and other features will produce noise effects on both sensor paths. The failure of a pre-stressing wire would generate a burst of sound that would travel through the water and encounter the sensing fibre, disturbing it. The acoustic wave would also travel in both directions along the pipeline, becoming slowly attenuated, resulting in a slow extinction of the disturbance in both sensing paths.

By continuously monitoring the interferometric sensor, the event can be recognized as being one of interest. A buffer of information indicative of the output of the location sensor (eg, the Phase OTDR sensor) is kept. When an event of interest is ascertained from the interferometric sensor, reference is made to the Phase OTDR results of the times just before and during that appearance of the anomalies of interest on the interferometric sensor. The Phase OTDR outputs are then used to determine the location along the sensor of the anomaly of interest.

THE DRAWINGS

The invention will be described further with respect to the following drawings, in which.

DETAILED DESCRIPTION OF THE INVENTION

The invention will now be described further with respect to the drawings.

Figure 1:
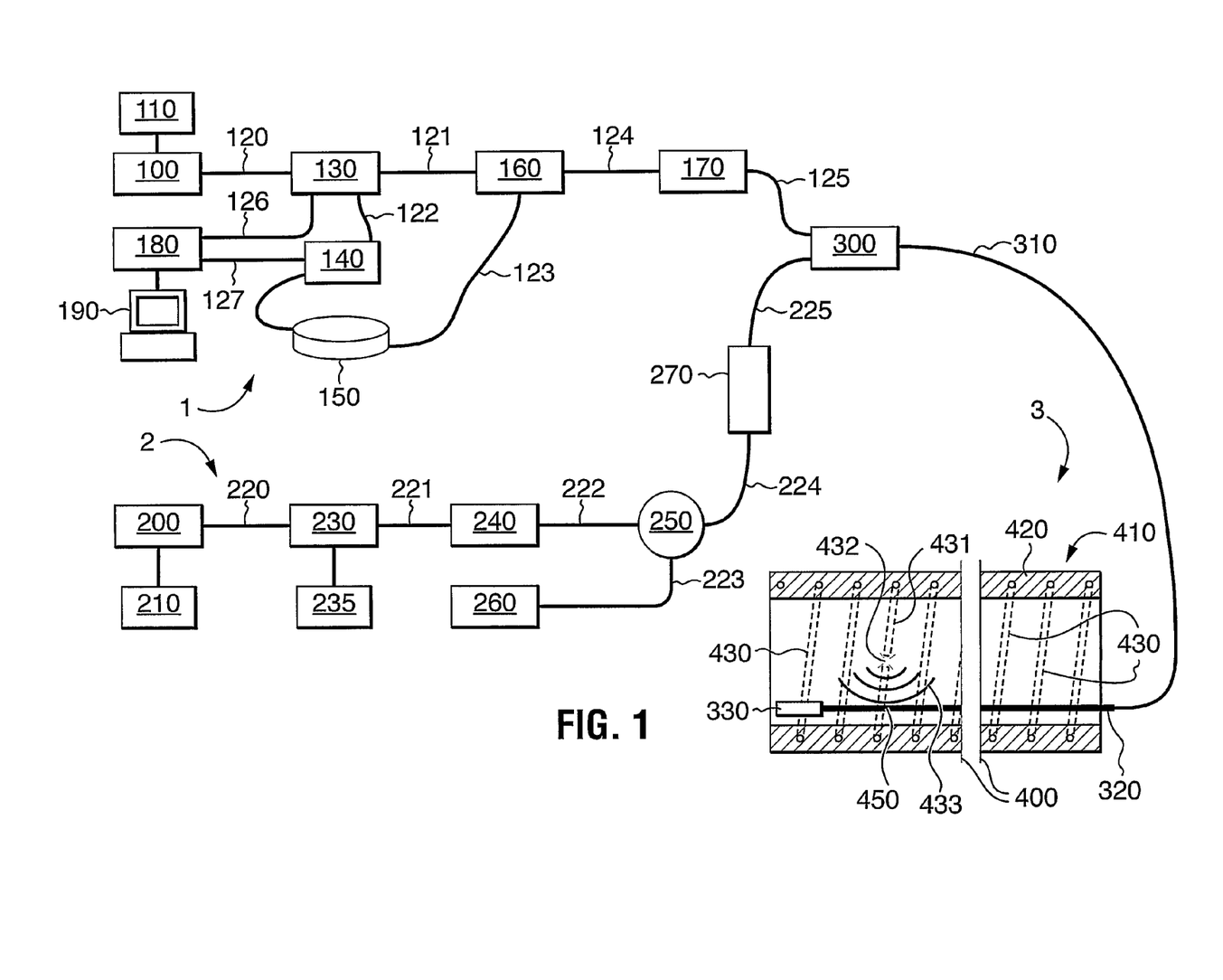
FIG. 1 shows a first embodiment of the invention in which both sensors are situated in the same fibre optic fibre.

FIG. 1 shows a first embodiment, in which the interferometric sensor and the location sensor are located on the same optical fibre. Equipment related to the generation of the interferometric sensor beam and for reading signals received by the interferometic sensor is indicated generally at 1, and such equipment has reference numerals between 100 and 199.

Equipment related to the location sensor is indicated generally at 2, and such equipment has reference numerals between 200 and 299. Equipment common to both, and the sensing portion, is indicated generally at 3. Other things present, such as the environment being sensed, are indicated by reference numerals higher than 400.

The portion of the apparatus which forms the interferometric sensor beam will first be described. The interferometric sensor exemplified is a known Sagnac type interferometer. The particular Sagnac-type interferometer used in the example herein was constructed by Pure Technologies Ltd., of 705 11$^{th}$ Ave. S.W., Calgary AB, Canada. Sagnac-type interferometers are available commercially from Blue Road Research, 219 NE 219$^{th}$ Avenue, Greshem, Ore, U.S.A.

Alternately, a Michelson interferometric sensor can be used. This can also be obtained commercially from Blue Road Research, of which the address is given above.

In the interferometric sensor exemplified, a source of coherent light (a laser) 100 and suitable control circuitry 110 for it are provided. In a particular example, the laser is chosen to give coherent light at a wavelength of approximately 1310 nm. However, this wavelength can be selected in known manner according to the particular type of fibre to be used, and expected sources of interference, so as to minimize probable interference and to maximize the signal from any expected disturbance which is sought to be monitored.

The laser signal is sent through a suitable optical fibre 120 to a coupler 130. The coupler 130 splits the laser output into two parts, which pass over optical fibres 121 and 122. Fibre 122 leads to a modulator 140, which modulates laser light passing through it. The modulated light is then sent through a delay coil 150, and is then sent back by line 123 to a coupler 160, the modulated light coming along branch 123 and the unmodulated light from fibre 121 go together out fo the coupler 160 on fibre 124. They pass through a short pass filter 170, which has the function of screening out wavelengths longer than the wavelength of the laser 100. For example, in this example, where the laser 100 has a wavelength of 1310 nm, the filter screens out wavelengths longer than 1310 nm., with the screening becoming more effective as the wavelength gets longer. This filter is used to eliminate extraneous wavelengths from the returning laser signals going to the receiver. From the filter 170, fibre 125 leads to a combining coupler.

The portion of the apparatus which forms the location sensor is now described. In the example shown, the apparatus is a Phase-OTDR sensor, as described in Taylor (SPIE, 2003). Any other laser sensor which is capable of sensing a disturbance of the type being monitored and its location could be used, such as a Brillouin based system available as a Ditest Model BOTR from Smartec SA located at Via Probette 11, CH6928 Manno, Switzerland.

The location sensor exemplified has a laser 200, suitably controlled by controls 210. In an example, the coherent light from the laser is at a longer wavelength than the light from laser 100. In the example, the wavelength is 1550 nm. The light passes through optical fibre 220 to a pulser 230, which is controlled by suitable controls 235. If desired, fibre 220 can contain an attenuator (not numbered) as known in the art. Pulser 230 causes the coherent light from the laser to be sent out in pulses, at a desired repetition rate. The pulses are spaced sufficiently so that the light can travel to the end of the sensor and back before the next pulse is sent out. Suitably, a pulse can be of the order of 20 to 1000 nanoseconds in length, and the repetition (refresh) rate should be at least 10 times a second, depending on the length of the sensor. Preferer rates are higher than this, being about 500 to 5000 kH. The sampling rate of the returning waveform will be chosen so as to get a spatial resolution of 0.2 km or less (i.e. an event seen can be located to within 200 meters). Preferably, it will be chosen to get an even smaller spatial resolution. Pulsed lasers are well known in the art, and a suitable pulse length, repetition rate, and sampling rate for the particular length and composition of the sensor being used can be chosen by a person skilled in the art.

In water pipelines, the propagation of the disturbance in both directions from the source offers the chance to greatly improve the accuracy of the location estimate, by using the expected symmetrical propagation pattern over many Phase-OTDR traces to more accurately measure the position of the origin of the disturbance, and to eliminate from consideration the portions of the trace that result from other noises in the pipeline. Thus, in water pipelines and similar applications, spatial resolution which is not as good as 200 meters can be tolerated, because the symmetrical phase-OTDR pattern can be used to improve the accuracy.

The pulsed light passes along fibre 221 and preferably through an amplifier 240 out from it along fibre 222. If the amplifier is not present, fibre 222 is merely a continuation of fibre 221.

The light then passes into a circulator 250. This is known in the art of fibre optic components. Two other fibres, 223 and 224 also enter the circulator. Fibre 223 goes to a receiver 260, and fibre 224 goes to a long pass filter 270.

The circulator, as known in the art, permits light to pass from fibre 222 to fibre 224, or from fibre 224 to fibre 223.

The long pass filter 270 screens out light which has a shorter wavelength than the light from coherent light source 200. Thus, with a light source 200 which outputs at 1550 nm, the long pass filter would screen out light with a wavelength shorter than 1550 nm., with the screening becoming more pronounced the shorter the wavelength becomes.

Light from the long pass filter goes along line 225 to the combining coupler 300.

In the combining coupler 300, light which has been generated by laser 100, both unmodulated and modulated, is sent along the same fibre as light from the line 225. This fibre is indicated at 310.

All of the optical fibres discussed so far, fibres 120, 121, 122, 123, 124, 125, 220, 221, 222, 223, 224, 225, and 310, and 336 and 227 (to be described) are preferably suitably shielded to minimize ambient noise so as to reduce interference in the sensor systems. Shielding may be by physical separation, or by the use of materials that will block disturbances, as is well known in the art.

Fibre 310 is attached to detector fibre 320. Fibre 320 is not shielded, so is capable of having perturbations created in the light within it by an external disturbance.

Suitably, detector fibre 320 may be quite long, for example up to 20 km. or more. To indicate that the full length of the detector fibre is not shown, two parallel lines 400 have been drawn across the sensor fibre. These do not indicate an interruption in the fibre, but merely that the fibre extends a long distance, and a portion of it has been omitted. Fibre 320 terminates at the terminator 330. The terminator has two parts. One is a "mirror" that reflects the 1310 nm light back. The other minimizes the reflections of the 1550 light. There are the normal functions of the terminator for an interpherometric sensor phased-OTDR sensor respectively.

Light passing from fibres 225 and 125 into fibre 310 and 320 proceeds through the length of the fibre to terminator 330. Whatever light is reflected back passes through coupler 300 to filters 270 and 170. Filter 270 excludes the light from the interferometric sensor, as that light has a wavelength of 1310 nm, and cannot pass through the filter 270. Filter 170 excludes light from the pulsed laser as that light has a wavelength of approximately 1550 nm, which cannot pass through filter 170.

Taking first the light which can pass through 170, this passes to coupler 130, after which it proceeds along fibre 126 to a receiver, analyzer and demodulator 180. The receiver-analyzer-demodulator also receives the modulating signal over fibre 127, so that it can have access to the interference of the counterpropagating light beams. The receiver and analyzer use the interferometric pattern of the light in conventional fashion to create a digital or analog output indicative of disturbances that have occurred along the fibre. An operator console 190 permits an operator to see the signal and to direct further operations, such as a Fourier transform or other analysis, on it.

Similarly, the light that passes through filter 270 goes to receiver 260, which produces an output which relates to the amplitude of the light and the elapsed time, from the start of the pulse. This is conveniently output as a three-dimensional plot, with a lapsed time recorded from successive pulses, the delay time for the OTDR reflections, and the amplitude.

In FIG. 1, the sensor 320 is shown schematically as resting along the bottom of a concrete pipe generally indicated at 410. The concrete pipe has a wall 420, in which are contained prestressing wires 430. Only a few such wires are shown in the drawing, but it is understood that such wires would be tightly wrapped around the pipe to keep it compressed. In the example, a wire 431 is broken at 432. As a result, acoustic waves and seismic waves (both generally shown as 433) expand outward from the break. The waves may be transmitted through the medium of the concrete pipe, or through the concrete pipe and through the fluid medium that it contains. These waves first impinge on the sensor at a point 450. Subsequently, waves also impinge on the sensor at locations extending in both directions from point 450, as subsequent parts of the acoustic and seismic wavefronts hit the sensor 320.

When the wavefront hits the sensor 320 at 450, and subsequently hits it at locations spreading outwardly from location 450 in both directions, this causes perturbations in the light waves in the fibre optic fibre 320, in both the light of 1310 nm from the interferometic sensor and the light at 1550 nm from the pulsed sensing system. Signals generated by these perturbations travel along fibre 320 and along fibres 125 and 225. The filter 170 filters out the 1550 nm wavelength light and the filter 270 filters out the 1310 nm wavelength. Thus, each receiver 180 and 260 receives substantially only the light generated by its associated laser, thus making analysis of disturbance of the light reacting to a disturbance in the fibre easier.

Figure 2:
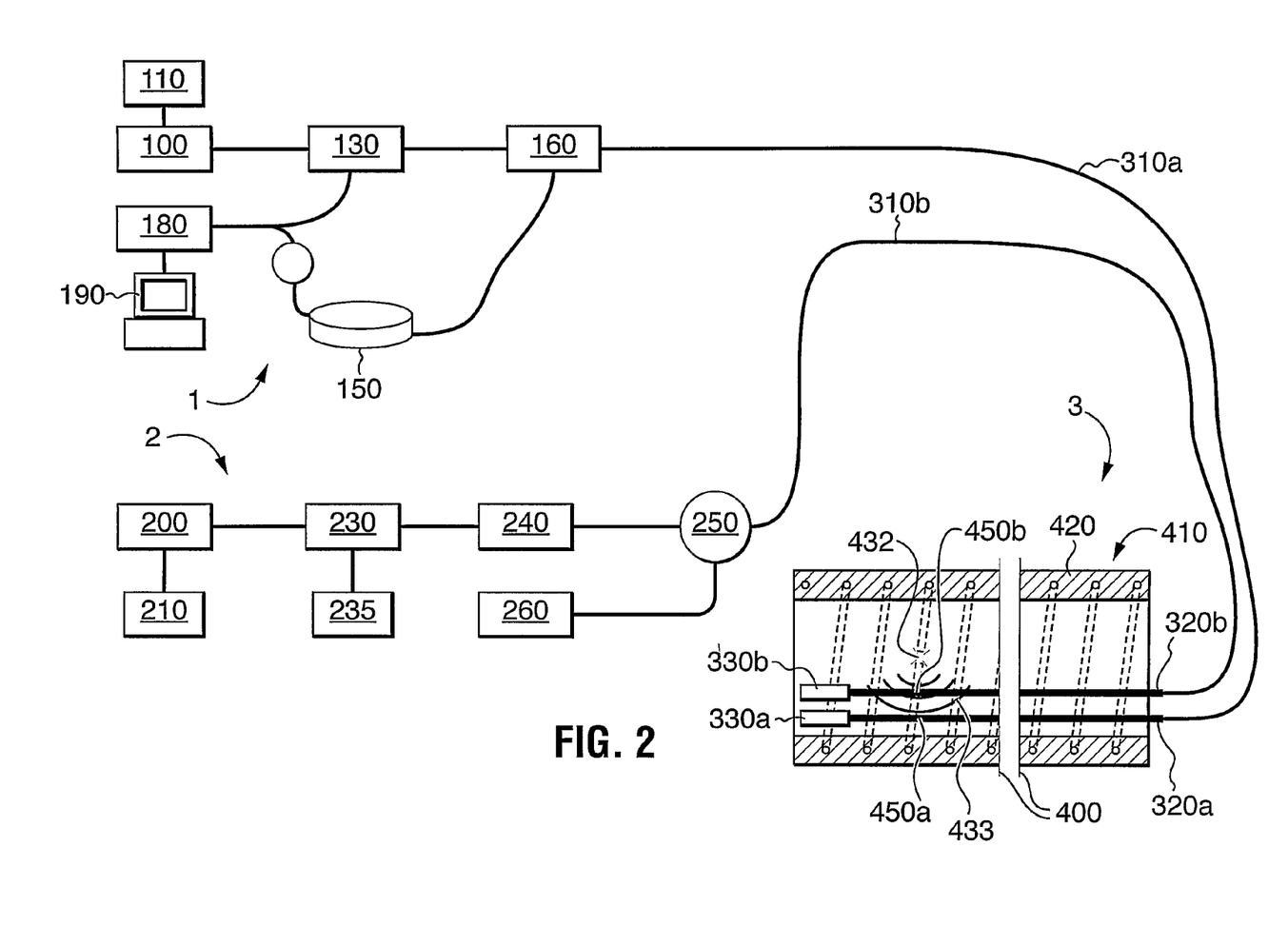
FIG. 2 shows a second embodiment of the invention in which the interferometer sensor and the location determining sensor are located on separate but adjacent optical fibres.

FIG. 2 shows an alternate form of the system. Similar numbers are used for similar parts.

The difference between FIGS. 1 and 2 is that the interferometric sensing laser and the position sensing laser are not connected to the same sensor. Instead, there is a sensor 320a or the interferometric sensor, and a sensor 320b for the position sensing laser. Each also has a separate terminator, numbered 330a and 330b respectively. For the terminator 330a, a mirror is used. For the terminator 330b, a non-reflecting terminator known in the art is used. Also, the filters 170 and 270 and the coupler 300 are not necessary, because the light from the two lasers is not sent through the same fibre. Indeed, it is no longer necessary to use different wavelengths of light. For example, in the FIG. 2 embodiment, both laser 100 and laser 200 could use light of 1550 nm if desired.

The system of FIG. 2 is preferred, because if there is a problem with one of the sensors, it can be removed and replaced without disturbing the other sensor (provided that the two sensors are not in the same cable). Also, it permits an optimal wavelength to be chosen for each sensor, without worry about having to have a sufficient separation between wavelengths to prevent overlap in signals.

In the FIG. 2 embodiment, the two sensors 320a and 320b must be adjacent to one another, so that each receives a signal from an event of interest, such as a wire break or a noise made by an intruder at substantially the same time. This is necessary so that the location can be determined with precision using the location determining system once the event of interest has been determined, using the interferometric system.

The distance between the two sensors can be varied according to the installation. Generally, however, it is preferred that the two fibre optic fibres 320a and 320b be adjacent to each other, as for example within a single cable which contains multiple fibres. In any event, it is preferred that there not be a separation of more than about 50 centimeters between the two fibres, and preferably not more than 10 centimeters.

EXAMPLE

The use of the apparatus to determine events of interest will be described with respect to a test facility. The test facility was set up as FIG. 2. Sensor 320a had a sensor length of 10 kilometers, and was laid in a disused concrete water pipe. Sensors 320b and sensor 320a were two individual fibres within a single fibre optic cable, and were of the same length.

The interferometric sensor had a wavelength of 1310 nm. The pulsed OTDR sensor had a wavelength of 1550 nm, and was set to scan the length of the optical fibre every 10 milliseconds. Each scan took 200 microseconds. At least 750 scans of the OTDR were retained in memory. As each new scan was added, the oldest scan was dropped.

For the purpose of the test, it was determined that an event of interest would be any event that gave an analog signal of greater than 5 volts on an analog output in the particular test facility. The analog output was an arbitrary representation of disturbances in the interferometric pattern in the Sagnac interferometric laser. An initial test showed that the cutting of a wire reinforcement in a concrete pipe gave a signal of 10 volts or more. As the test was to see if wire breaks could be detected, it was decided that the threshold for an event of interest would be set at approximately half that level, or 5 volts.

Figure 3:
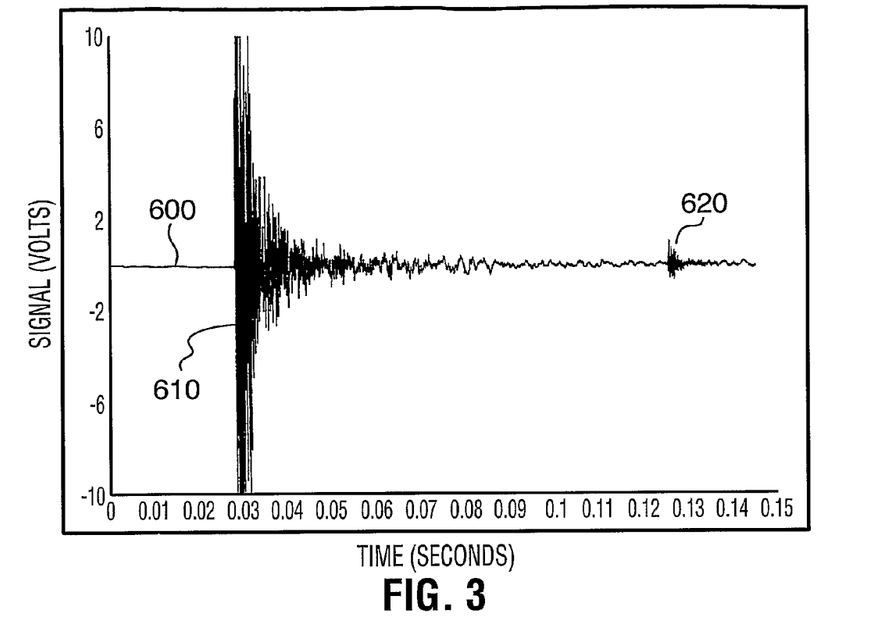
FIG. 3 shows the output of an interferometic sensor recorded over a period of time indicated in milliseconds, and containing a sensed event.

FIG. 3 shows, as an analog signal output of volts relative to time, the output of the interferometric sensor as recovered at receiver 180. Deviations from the central line represent a phase shift in the returning light. The time is arbitrary, from a base 0 which is common to both sensor outputs. It will be noted that the interferometer gives essentially a flat signal 600 (no phase shift between the light sent out and the light received), until approximately 30 milliseconds on the arbitrary scale. Then, it gives a large response 610. The response decays rapidly, but there are still more perturbations in the signal than there were prior to the event which occurred at 30 milliseconds. At approximately 126 milliseconds on the arbitrary scale, a further event 620 that perturbs the light occurs.

The event which triggered at approximately 30 milliseconds is greater than 5 volts on the arbitrary scale, and is therefore an event of interest. Therefore, the position locating laser output (OTDR output) for at least 30 milliseconds (150 sweeps) prior to the beginning of the apparent event of interest are saved, as are at least 600 subsequent sweeps.

Figure 4:
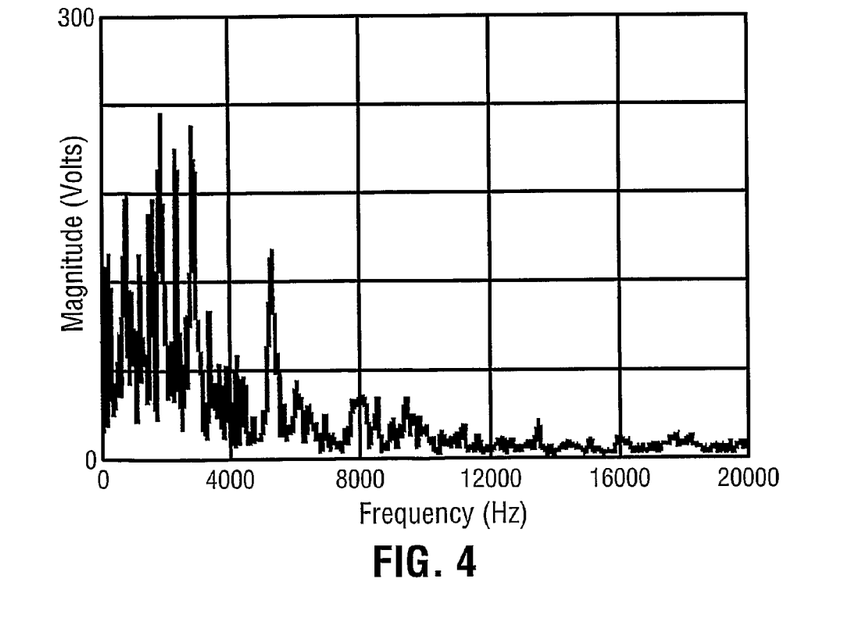
FIG. 4 shows a Fourier transform of the output of the interferometic sensor shown in FIG. 3.

If it is desired to be more certain that the event is in fact an event of interest, the operator can then decide to do a Fourier transform of the signal from the interferometer from the time just before during and after that event. Such a Fourier transform is shown in FIG. 4. This shows that there is a considerable increase at the time of the event in the amount of energy at wavelengths below 4 KHz. However, this is only indicative of a shock hitting the sensor, and is not too helpful for characterization. However, there is also an increase in energy at wavelengths between 4 KHz and 8 Kz, which is typical of the pattern seen when a prestressing wire in a concrete pipe breaks. Thus, the Fourier Transform confirms that the event is indicative of a wire break, which is an event of interest when monitoring a concrete pipe having wire wrapping.

Figure 5:
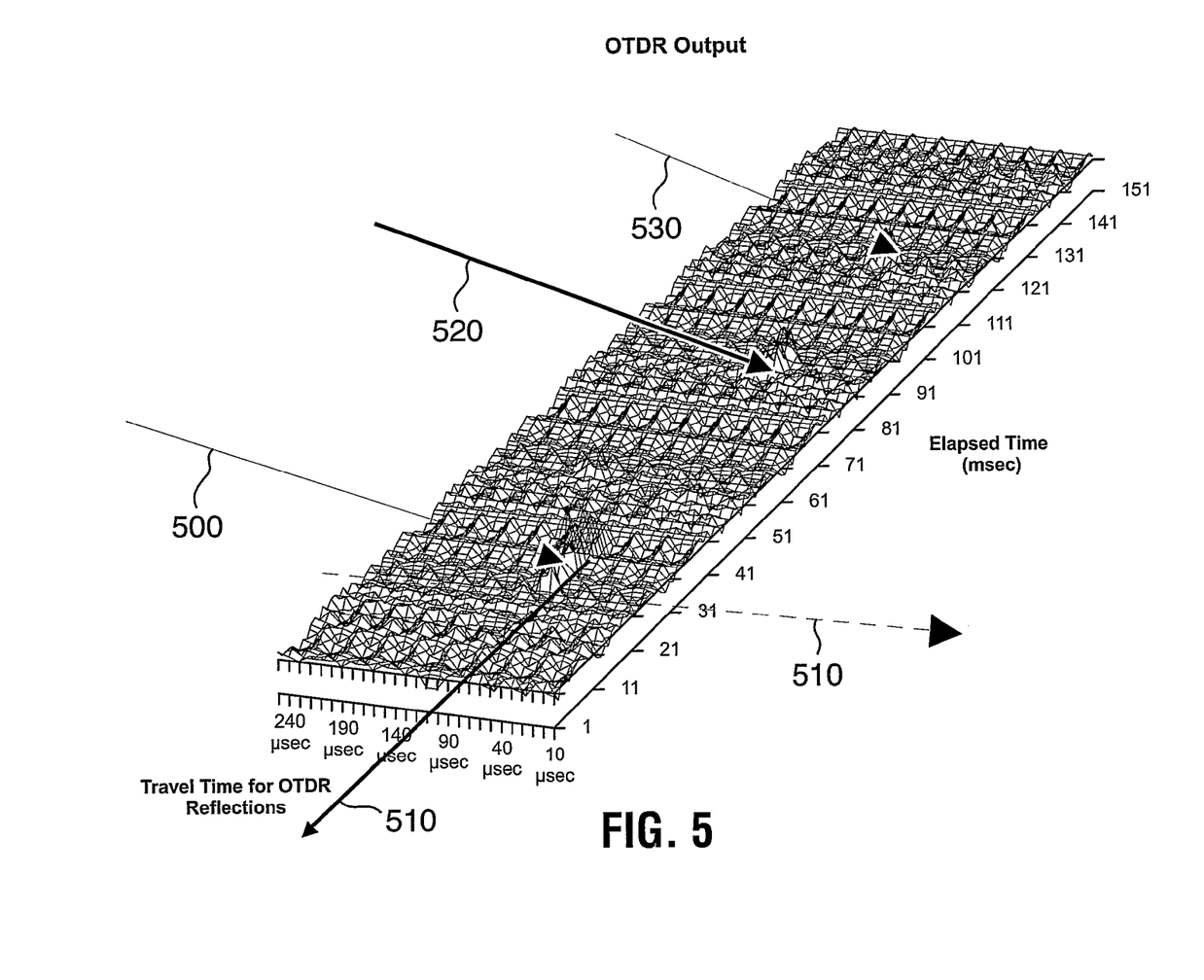
FIG. 5 shows the signal output from the location sensor for a time period just before, during and after the event recorded in FIG. 3.

Because this is an event of interest, the location is to be determined. FIG. 5 is a graph of the output of the OTDR location sensor. The graph is in three dimensions. The scale on the right shows the elapsed time in milliseconds. The scale on the left shows the scan times for the OTDR. Each line across the graph parallel to the scale is the trace of one scan. It will be remembered that in this example the scans repeat every 200 microseconds, The vertical axis (showing peaks) is an arbitrary scale showing deviations from the ordinary background noise. Conveniently, this scale can be expressed in volts, but the magnitude is not of interest in the particular application, except to determine that the event has passed the arbitrary minimum defined to be an event of interest. Instead, only the time on the arbitrary millisecond scale is of interest.

As the event of interest had been found on the interferometer scale at approximately 30 milliseconds (arbitrary scale) a dashed line is drawn through the graph at this point (this line is indicated at 500). A series of peaks is found starting at approximately the line 500, these peaks having a duration of approximately 10 milliseconds. A line 510 is drawn to project the beginning of these peaks to the OTDR scale. It is found that the line crosses the OTDR scan scale at approximately 87 microseconds into the scan.

In other words, the perturbation is noted when the ODTR pulse had passed down the fibre for 87 microseconds. It is known that the particular fibre transmits light of this wavelength at 9.73 microseconds/km. Thus, the location of the perturbation corresponds to a position of 87/9.73 km, which is 8.94 kilometers, from the beginning of the sensor 320a and 320b.

The location at 8.94 km down the sensors, in the concrete water pipe, is examined, and is found to correspond to a location where an induced wire breakage has been done during the test.

It will be noted that there are several other comparable events on the OTDR, at approximately 85 milliseconds and at approximately 121 milliseconds. These have been indicated as 520 and 530. As the event 520 had no corresponding peak whatsoever on the interferometric sensor, this can be considered as noise. The event 530 did have a small corresponding peak 620 at approximately the same time on the record (FIG. 3) of the interferometric sensor output. This is below the threshold of what has been defined as a significant event. Normally, therefore, it would not be considered further. However, in this case, because it is so closely linked in time to an event of interest, it may be desirable to examine the signal at 620 on the interferometric output further. For example, a Fourier transform of this signal could be done to see whether a characteristic signature of an event of interest could be noted. Alternately, it may be considered that the event reference by the numerals at 530 and 620 is not of sufficient interest (because of the relatively small interferometric output) for further consideration.

It will be noted that the event at 520 on the OTDR output does not have a corresponding event in the interferometric output. It happens frequently that there is a signal on one or other of the OTDR or interferometric signals, but no corresponding output on the other one. In such a case case, the signal is regarded as noise and is ignored, because it has not been confirmed by a signal on the other sensor.

Further embodiments of the invention will be evident to a person skilled in the art, and it is intended that the appended claims be interpreted as including all such variants.

What is claimed is:

1. A fibre optic monitoring system for detecting and locating disturbances along a predetermined length, which comprises:
    a first fibre optic sensor which extends along said predetermined length and which continuously detects disturbances along the entire predetermined length and produces a first output
    a second fibre optic sensor which extends along said predetermined length and which produces a second output which detects disturbances and their locations along the predetermined length
    means for analyzing the output of said first fibre optic sensor to identify disturbances sensed by said first fibre optic sensor which have at least one predetermined characteristic
    means for analyzing the output of said second fibre optic sensor to determine whether a disturbance was sensed by said second fibre optic sensor at a time approximately corresponding to the time at which the first fibre optic sensor sensed a disturbance with said one predetermined characteristic, and, if so, the location, along said predetermined length, of the disturbance sensed by the second fibre optic sensor.

2. Apparatus as claimed in claim 1, in which the first fibre optic sensor is an interferometric sensor.

3. Apparatus as claimed in claim 1, in which the first fibre optic sensor is a Sagnac effect sensor.

4. Apparatus as claimed in claim 1 in which the first fibre optic sensor is a Michelson sensor.

5. Apparatus as claimed in claim 1, in which the second fibre-optic sensor is a phase-OTDR sensor.

6. Apparatus as claimed in claim 1, in which the second fibre-optic sensor is a Brouillon-effect sensor.

7. Apparatus as claimed in claim 1, in which said one predetermined characteristic is that the disturbance gives rise to a signal from the first fibre optic sensor, which signal has more than a predetermined peak energy.

8. Apparatus as claimed in claim 1, in which said one predetermined characteristic is the that the disturbance gives rise to a signal from the first fibre optic sensor, which signal has a spectral distribution which has been predetermined as being of interest.

9. Apparatus as claimed in claim 1, in which the first fibre optic sensor and the second fibre optic sensor share a common optical fibre for said predetermined length.

10. Apparatus as claimed in claim 1 in which the first fibre optic sensor and second fibre optic sensor are in separate optical fibres which are laid adjacent to one another for the predetermined length.

11. A method for locating disturbances along a fibre optic detector system of predetermined length, which comprises:
    continuously sensing for disturbances along said predetermined length with a first optical fibre sensor and producing a first output signal from said first optical fibre sensor, when disturbances are detected, analyzing said output signal, to determine if it has at least one predetermined characteristic, simultaneously sensing for disturbances using second fibre optic sensor which extends along said predetermined length and which produces a second output which detects disturbances and their locations along the predetermined length when a disturbance is found by said first fibre optic sensor which has such predetermined characteristic, then analyzing the output of said second fibre optic sensor to determine whether a corresponding disturbance was sensed at a time approximately corresponding to the sensing by the first fibre optic sensor of said disturbance with said one predetermined characteristic, and, if so, determining the location of such corresponding disturbance along said predetermined length.

12. A method as claimed in claim 11, in which the first fibre optic sensor is an interferometric sensor.

13. A method as claimed in claim 11, in which the first fibre optic sensor is a Sagnac effect sensor.

14. A method as claimed in claim 11 in which the first fibre optic sensor is a Michelson sensor.

15. A method as claimed in claim 11, in which the second fibre-optic sensor is a phase-OTDR sensor.

16. A method as claimed in claim 11, in which the second fibre-optic sensor is a Brouillon-effect sensor.

17. A method as claimed in claim 11, in which said one predetermined characteristic is that the disturbance gives rise to a signal from the first fibre optic sensor, which signal has more than a predetermined peak energy.

18. A method as claimed in claim 11, in which said one predetermined characteristic is that the disturbance gives rise to a signal from the first fibre optic sensor, which signal has a spectral distribution which has been predetermined as being of interest.

19. Apparatus as claimed in claim 1, in which the first fibre optic sensor is a Sagnac effect sensor and the second fibre-optic sensor is a phase-OTDR sensor.

20. A method as claimed in claim 11, in which the first fibre optic sensor is a Sagnac effect sensor and the second fibre-optic sensor is a phase-OTDR sensor.

* * * * *